UNITED STATES PATENT OFFICE.

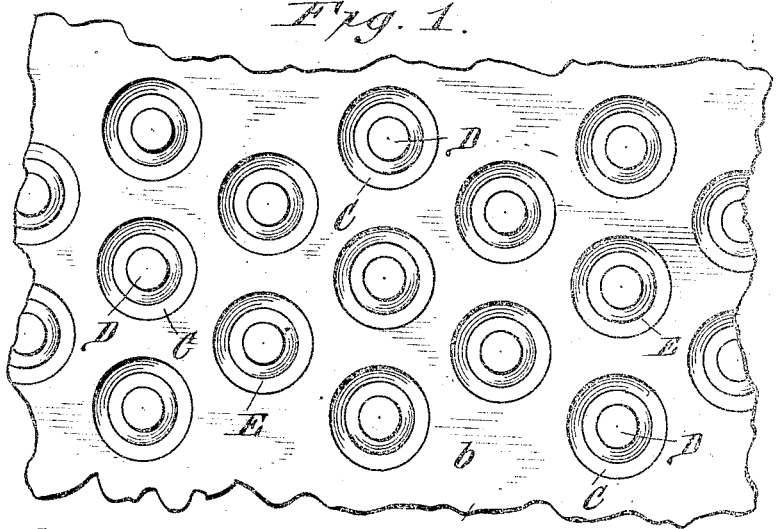
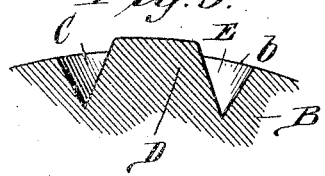
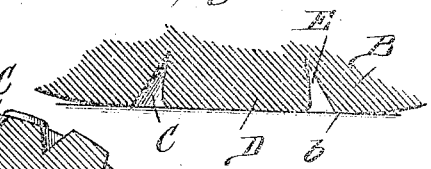
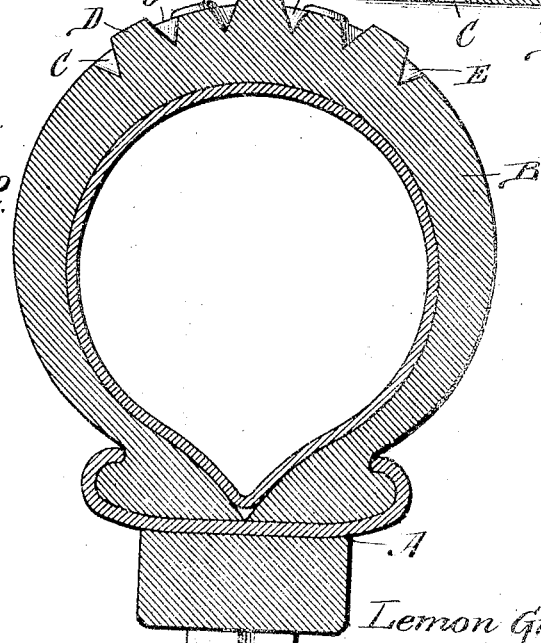

LEMON GREENWALD, OF BUFFALO, NEW YORK.

NON-SKID TIRE.

952,039.

Specification of Letters Patent. Patented Mar. 15, 1910.

Application filed May 25, 1908. Serial No. 434,799.

*To all whom it may concern:*

Be it known that I, LEMON GREENWALD, a citizen of the United States, and resident of Buffalo, in the county of Erie and State of New York, have invented certain new and useful Improvements in Non-Skid Tires, of which the following is a specification.

My invention relates to pneumatic-tires and tire treads of the non-slipping type.

One object of my invention is the production of a tire or tire-tread of the non-slipping type which possesses all the qualities of a smooth or plain-surfaced tire or tread, yet provides positive gripping action and reduces the vibration of the vehicle, and when used on soft roads, provides for the release of soil or slush filling the depressions of the tire.

Another object is to provide the tire with gripping-studs so formed with the body of the tire or tread and so related to the surface of said body or tread that they become compressed under the weight of the car until their outer surfaces are flush with the surface of the tire or tread when in contact with the road-surface.

A further object is the provision of radial gripping-studs that cannot be deflected from their true radial positions so that the wear will always be on the outer surface of the same, in contradistinction to the studs of tires of this type now in use which tend to flex as they come in contact with the road-surface and consequently wear quickly and in a short time defeat the purpose for which they were provided.

A still further object is to so form the studs that when compressed and they leave the road-surface, they quickly recover and assume their normal condition, and in so doing tend to accelerate the velocity of the wheel, thus producing increased activity, greater firmness, and greater resistance to the road, resulting in a tire from which more mileage will be received than with tires of this type now in use under the same conditions and with the same motive-power.

As the tendency lies toward increasing the speed or activity of tires, and the wearing qualities of a tire are always uppermost in the manufacture of tires, my invention was designed to meet these requirements while providing a perfect non-slipping surface.

The invention consists in a tire or tire-tread having depressions and compressible studs rising from the bottoms of said depressions and extending beyond the tread-surface; and it further consists in the arrangement, formation, and disposition of the various component parts of the tire or tread, as shown in the accompanying drawings forming a part of this specification and as hereinafter described and claimed.

In the drawings,—Figure 1 represents a part of a tire in plan view, the same being laid out flat. Fig. 2 is a cross-section of a tire embodying my invention and applied to a wheel-rim also shown in cross-section. Fig. 3 is an enlarged transverse section through a portion of the tread, showing the stud in normal condition. Fig. 4 is an enlarged section through a portion of the tread taken circumferentially and showing the same in contact with the road-surface.

The tire herein shown is of the type known as a double-tube clencher-tire, but as this is merely shown as a representative use of my invention, it is to be understood that the invention can be embodied in any form of tire or tire-tread, and as it is equally applicable to rubber mats or flooring, and to other articles where a gripping surface is desirable or necessary, I do not wish to limit myself in its use to tires, although primarily designed for that purpose.

Referring now to the drawings in detail, like letters of reference refer to like parts in the several figures.

In the drawings, the reference letter A designates a vehicle-rim, B the tire and b the tread-surface. In the tread of the tire, depressions C are formed from the bottom of which rise radial compressible studs D which project out of the depressions a slight distance beyond the tread-surface. Owing to these studs extending beyond the tread-surface, they come in contact with the road-surface as the wheel revolves and are compressed under the weight of the vehicle, in the manner shown in Fig. 4, thus allowing the natural tread-surface to come in contact with the road and also providing an even contact at the bottom of the tire without projecting parts. As the compressed studs are moved rearward out of contact with the road-surface, they expand and assume their normal condition and in so doing, tend to raise the wheel from the road-surface, which results in a quick reaction and renders the tire very active so that increased speed is obtained.

The sides of the depressions C are tapered inwardly and the sides of the studs are tapered from their base to their outer ends, thus providing annular V-shaped grooves E. This is the preferred construction, since it permits lateral distension of the studs when compressed and simultaneously acts to crowd out soil or slush entering said grooves while being compressed, the tapered sides of the depressions facilitating such action. It is to be noted that when the studs are compressed, the V-shaped grooves surrounding them become reduced in width by reason of the lateral distension of said studs, and when the latter are moved rearward out of contact with the road-surface, their return to normal condition causes the grooves to be enlarged to normal size by the tapered side walls of the studs moving away from the side walls of the depressions and this frees the soil or slush held in said grooves so that the studs have free action when they again come in contact with the road surface. Said studs, therefore, serve to free the grooves since their quick reaction loosens the soil or slush lodged in the grooves. By compressing the studs so that their outer surfaces are brought flush with the surface of the tread proper, they are relieved of much wear and are serviceable for a longer period of time than tires in which the gripping elements project wholly from the surface of the tread.

Although the relative location of the depressions with the studs are not essential, I prefer to arrange them in staggered relation one to the other, both transversely and longitudinally.

A tire constructed according to this invention will effectively guard against slipping on hard and smooth roads and will, owing to its quick recovery and the fact that the air is trapped in the grooves surrounding the stud, greatly accelerate the speed of the wheel.

Having thus described my invention, what I claim is,—

1. A tire having a tread-surface provided with a series of depressions whose side walls are beveled and studs within said depressions projecting outward beyond said tread-surface.

2. A tire having a tread-surface provided with a series of depressions whose side walls are beveled and compressible frusto-conical studs in said depressions projecting beyond said tread-surface and separated from the side-walls of said depressions by V-shaped grooves.

3. A tire having a tread surface provided with a series of depressions and studs within said depressions projecting outward beyond said tread surface.

In testimony whereof, I have affixed my signature in the presence of two subscribing witnesses.

LEMON GREENWALD.

Witnesses:
ELLA C. PLUECKHAHN.
EMIL NEUHART.